No. 693,776. Patented Feb. 18, 1902.
G. H. DE BERLY & E. G. RASSINIER.
BRAKE FOR VEHICLES.
(Application filed Nov. 1, 1901.)
(No Model.) 2 Sheets—Sheet 1.
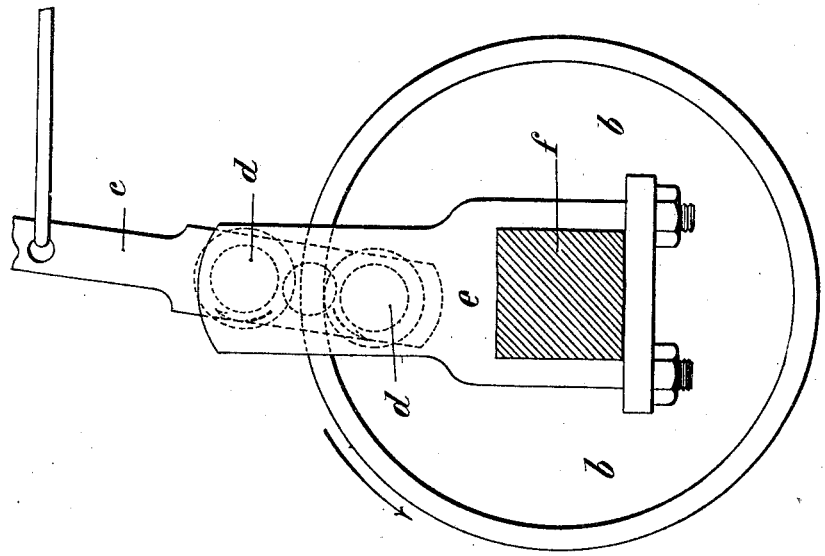
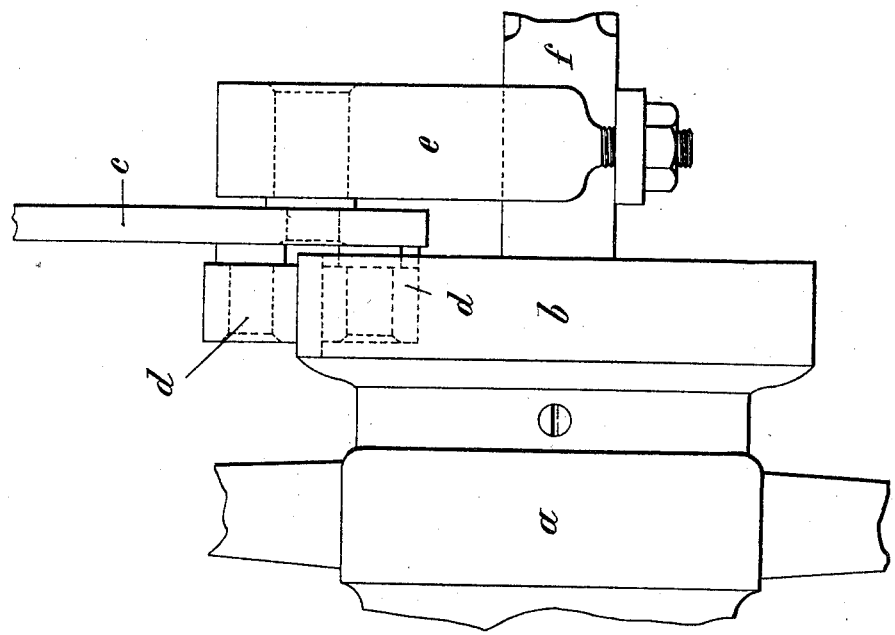
WITNESSES
Paul Hunter
J. B. Owens.
INVENTORS
Gaston H. de Berly
Eugène G. Rassinier
By
ATTORNEYS

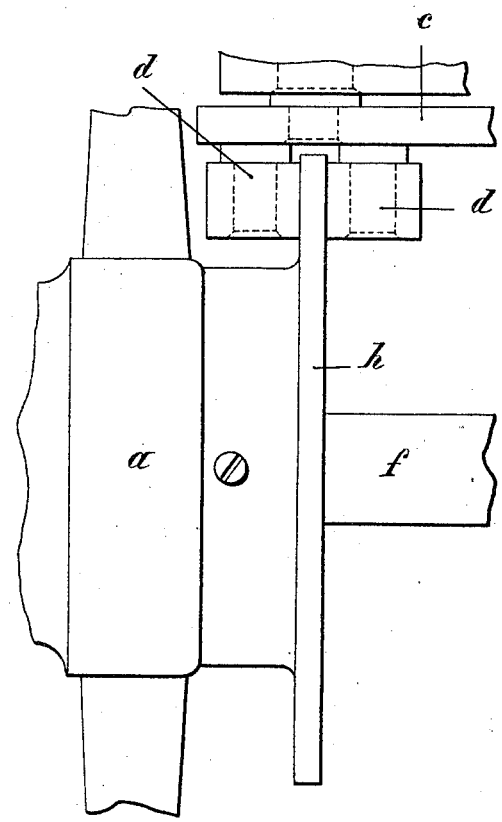

UNITED STATES PATENT OFFICE.

GASTON HENRY DE BERLY AND EUGÈNE GEORGES RASSINIER, OF PARIS, FRANCE.

BRAKE FOR VEHICLES.

SPECIFICATION forming part of Letters Patent No. 693,776, dated February 18, 1902.

Application filed November 1, 1901. Serial No. 80,801. (No model.)

*To all whom it may concern:*

Be it known that we, GASTON HENRY DE BERLY, gentleman, of 47 Rue de Lisbonne, and EUGÈNE GEORGES RASSINIER, locksmith, of 4 Rue Damrémont, Paris, in the Republic of France, have invented Improvements in or Connected with Brakes for Velocipedes and Motor-Driven and other Vehicles, of which the following is a full, clear, and exact description.

This invention refers to brakes applicable for use with velocipedes and motor-driven and other vehicles.

Our invention is chiefly characterized by the combination of a sleeve or a plate carried and fixed to the hub or the spokes of the wheel of the vehicle, which flange or plate is acted upon with braking effect by two rollers carried upon a lever, which latter is pivoted to the axle or other part of the vehicle. By the operation of this lever a progressive grip is obtained upon the inside or outside of the sleeve or upon both sides of the plate.

In order that our invention may be readily understood, we have shown in the accompanying drawings examples of construction of brakes according to our present invention.

In the drawings, Figure 1 shows in elevation an example of our brake where the lever and rollers are arranged vertically, so as to act both upon the internal and external peripheries of the sleeve. Fig. 2 is an end elevation of the same construction. Fig. 3 shows an elevation of our improved brake arranged with a plate, upon the faces of which the rollers act. In this case the rollers, as well as the lever which carries them, are fitted horizontally.

Similar letters of reference refer to like parts in the several figures of the drawings.

As shown in Figs. 1 and 2, upon the hub $a$ of the wheel is fixed in any convenient manner a sleeve $b$. In this example the lever $c$, carrying the rollers $d$, is jointed upon a forked support $e$, fixed upon the axletree $f$. One of these rollers $d$ is arranged inside the sleeve $b$, while the other roller $d$ is arranged outside the said sleeve. It will thus be understood that if the lever $c$ is operated either in one direction or the other the rollers $d$ will be brought into contact with the sleeve and will revolve at this moment at the same time as the latter, and according as the drag on the lever increases the grip of the rollers upon the sleeve will also increase progressively until the vehicle is brought to rest, and that no matter in which direction the wheel is revolving.

In the modification shown in Fig. 3 the lever $c$, as well as the rollers $d$, is arranged horizontally. The rollers $d$ in consequence of the drag exercised upon the lever $c$, which carries them, act upon a plate $h$, fixed upon the hub $a$ of the wheel in any convenient manner.

It will be readily understood from the foregoing that the brake will effectively act in whichever direction the wheel may be revolving and also that when the brake-lever is not acted upon and is in its normal position of inaction the rollers are not in contact with the sleeve or plate, and the wheel is consequently free.

It is to be understood that the actuating-lever $c$ may be operated in any convenient manner and either directly or through suitable connections.

Such being the general construction and arrangement of our improved brake, it is obvious that the mere form, details, and materials employed in the construction may be varied as called for by circumstances or requirements without departing from our invention.

We claim—

1. In brakes for velocipedes, motor-driven, and other vehicles, the combination of a sleeve or plate carried by the hub or spokes of the wheel of the vehicle, a lever pivoted from the axle or other part of the vehicle and carrying two rollers to act upon the sleeve or plate, by the operation of the lever, and adapted to obviate friction, to obtain a progressive grip, and thus effect the complete stoppage of the vehicle, substantially as and for the purposes described with reference to the accompanying drawings.

2. The combination with a wheel of a vehicle, of a circular member mounted to turn with the wheel, brake-shoes arranged at the inner and outer faces of said member, and a lever pivoted to a fixed part of the vehicle and carrying said brake-shoes, the lever when moved on its pivot in either direction applying the brake-shoes to the inner and outer faces of the member.

3. The combination with a vehicle-wheel, of a member mounted to turn with the wheel, rollers forming brake-shoes arranged at the inner and outer faces of said member, a fixed support carried by the vehicle, and a lever carrying said rollers at one side thereof and pivoted to said support, the lever turning on its pivot to apply the rollers to the inner and outer faces of said member.

The foregoing specification of our improvements in or connected with brakes for velocipedes and motor-driven and other vehicles signed by us this 17th day of October, 1901.

GASTON HENRY DE BERLY. [L. S.]
  EUGÈNE GEORGES RASSINIER. [L. S.]

Witnesses:
  J. ALLISON BOWEN,
  MAURICE H. PIGUET.